July 28, 1959 C. E. LOMAX 2,897,280

INTER-OFFICE TRUNKING SYSTEM

Filed Dec. 26, 1956 7 Sheets-Sheet 1

INVENTOR.
CLARENCE E. LOMAX
BY
C. A. Gilbrandsen
ATTY.

INVENTOR.
CLARENCE E. LOMAX
BY
C. A. Gulbrandsen
ATTY.

July 28, 1959 C. E. LOMAX 2,897,280

INTER-OFFICE TRUNKING SYSTEM

Filed Dec. 26, 1956 7 Sheets-Sheet 3

INVENTOR.
CLARENCE E. LOMAX

BY

C. A. Gulbrandsen

ATTY.

July 28, 1959 C. E. LOMAX 2,897,280

INTER-OFFICE TRUNKING SYSTEM

Filed Dec. 26, 1956 7 Sheets-Sheet 4

INVENTOR.
CLARENCE E. LOMAX

BY C. A. Gulbrandsen
ATTY.

INVENTOR.
CLARENCE E. LOMAX

BY

C. A. Gulbrandsen

ATTY.

INVENTOR.
CLARENCE E. LOMAX
BY
C. A. Gulbrandsen
ATTY.

July 28, 1959 C. E. LOMAX 2,897,280

INTER-OFFICE TRUNKING SYSTEM

Filed Dec. 26, 1956 7 Sheets-Sheet 7

INVENTOR.
CLARENCE E. LOMAX

BY

C. A. Gulbrandsen

ATTY.

United States Patent Office 2,897,280
Patented July 28, 1959

2,897,280

INTER-OFFICE TRUNKING SYSTEM

Clarence E. Lomax, Chicago, Ill., assignor to General Telephone Laboratories, Incorporated, a corporation of Delaware Application December 26, 1956, Serial No. 630,626
10 Claims. (Cl. 179—18)

This invention relates to telephone systems and more particularly to a system having a number of inter-connected offices.

It is an object of the present invention to provide, in a multi-office network, a trunking system which allows inter-office trunks to be used exclusively in one direction, such as from east to west until the need arises for additional trunks to handle west to east traffic. Certain of the east to west trunks would then be transferred to fulfill the requirements of the west to east traffic, this transfer occurring as the traffic requires and indicates.

It is a further object to provide an overflow trunking arrangement in which the overflow trunks are returned to their normal direction when the traffic conditions show that the heavy traffic situation has abated.

A feature of the invention consists of the grading between a large number of selector contacts and bi-level repeaters in such a manner that the efficiency of a single large group is approached.

Another feature consists in the use of a battery searching access from the selectors to the outgoing repeaters. Thus when an outgoing repeater is to be used as incoming, the resistance battery seizure path may be opened in the repeater and the repeater will then be artificially busied to all outgoing calls by this absence of battery.

A further feature consists of transferring the direction of access of all the transferable repeaters which are idle at the time of transfer, and as busy repeaters of the transfer group are released, their direction of access is then changed. This process continues until all the repeaters in the transfer group have been transferred.

A still further feature consists of providing bi-level repeaters which in their normal condition handle calls exclusively to two offices of a multi-office exchange in one direction, and on application of a signal, will handle calls from the multi-office exchange.

The telephone system as set forth in the present invention is adapted for use in a situation where a single exchange composed of a number of offices has been serving an area. As the area expands, outlying exchanges will of necessity be added to the system. It is desirable that all the subscribers within the system may call or be called on a wholly automatic basis. It is further desirable that all subscribers in the system may be reached by use of a single digit office code after which a like number of digits should be required to call all subscribers within any office. It is to provide a network of this type that the present invention has been devised.

In a system of the nature described, it is often true that the new exchange (#2 office) is of a residential character and would experience its busy periods during the early evening hours. The old exchange (#3—#9 offices) more than likely would be of a more commercial nature having its busiest hour during the morning business hours. Naturally trunks would have to be provided between the exchanges, and a large saving would be effected if dual-purpose trunks could be provided. These trunks would be used as incoming to the #2 office for normal usage and transferred as the need dictates, for use as outgoing from the #2 office. This transfer would more than likely occur in the evening and would remain in effect until the outgoing traffic lessened considerably.

In general, overflow equipment is a frequently used and valuable adjunct to a telephone system in reducing the number of trunks required by the busy hour traffic. When inter-office trunks are used for overflow purposes the general tendency is to use a standard two-way trunk which may in normal use be accessible from either of its ends. With the use of these trunks, the possibility of having double-connections arises and it is partially to remedy this condition that the present system has been devised.

Referring to the drawings, Figs. 1A and 1B show a schematic drawing of the present invention as applied to a two exchange network, Fig. 1A showing the #2 office exchange and Fig. 1B the #3—#9 offices exchange. Fig. 1C shows the relative positions of the figures as drawn. Figs. 2 and 3 show in detail the trunk transfer circuit. Figs. 4, 5 and 6 show in detail the various repeaters required by the present invention.

Fig. 1A shows a skeleton portion of the equipment in the #2 office necessary to complete an outgoing inter-office call to offices #3—#9 of Fig. 1B. The apparatus shown is of the generally known Strowger or step-by-step type, therefore the only portions which are shown in detail in the specification are those which are not within the field of general knowledge.

When a party such as 2400 within the #2 office of Fig. 1A wishes to initiate a call, the line equipment 10 is seized in a known manner. Selector 11 is also seized. The selector used is a battery searching, 10 level, 20 trunk selector as set forth in U.S. Patent 2,673,244, issued to C. E. Lomax on March 23, 1954. If a local or intra-office call is desired, the first digit dialled is 2. The call would be completed in a well-known manner using selectors, connectors and the like.

When subscriber 2400 desires to make an inter-office call to one of the other offices, the line equipment 10 is seized along with first selector 11. Subscriber 2400 then dials one of the office code digits such as 3—9 which we in this case will assume to be 9. The selector steps to the ninth level and begins searching the level. As has been stated, each selector level has twenty trunks and the contacts will be considered as numbered from 1 to 20. The odd numbered contacts appear on the lower bank and the even numbered contacts on the upper bank. Thus, when the wiper makes its first rotary step on a particular level, the lower wipers will rest on trunk number 1 while the upper wipers rest on trunk number 2. In this schematic Fig. 1A, only a representative few of the first selector bank connections have been shown. For purpose of explanation it will be assumed throughout the present specification that all selector contacts not having a repeater connection have been busied out and cannot be accessed. A more thorough explanation of these connections will follow in the section on selector grading.

As shown on the ninth level of selector 11, the first C group selector contact shown having a repeater connection would be the fifth. As mentioned previously, for purposes of explanation it is assumed that the contacts 1—4 are busy. The selector will then find idle contact 5 which is connected to repeater 41. Repeater 41 will then be seized over conductor C401. It should be noted that contact 10 on level 8 of B group selector 13 is also connected to repeater 41 and would then be artificially busied. Repeater 41 and also repeaters 42, 43 and 51 are of the bi-level type, which means that these repeaters may be accessed from two of the levels at the first selectors. The bi-level repeater is generally known from U.S. Patent 1,990,644, issued to H. M. Friendly on February 12, 1935.

The repeater 41 seized would then seize incoming selector 81 of Fig. 1B. Selectors 81, 82, 83 and 84 are of the 20 level, 10 trunk type as set forth also in the previously cited Lomax patent. In this selector 81, the #8 and #9 offices each have a ten level representation and in this instance the levels leading to office #9 would be selected. Subscriber 2400 would then continue dialling the remaining digits of the subscriber to be called in the #9 office and these dial pulses would be transmitted to the local equipment in the #9 office to complete the call.

For normal first choice inter-exchange calls from the #3—#9 offices to office #2, repeaters such as 71 are provided which have direct access to second selectors such as 22 of office #2. This type of repeater is of the single level type and any repeater of suitable type may be used.

Last choice inter-exchange calls from the #3—#9 offices use the repeater 61 which is of the type shown in Fig. 6. Repeater 61 then seizes repeater 51 of office #2 which is shown in detail in Fig. 5. Repeater 51 seizes second selector 21 to complete the call through the local equipment in the #2 office.

When traffic conditions become excessively heavy as defined by the trunk transfer circuit Figs. 2 and 3, repeaters 51 and 61 are transferred so that they can no longer be accessed from the #3—#9 offices and are accessible at the #2 office.

As mentioned briefly, the grading and pairing of the selector contacts in the #2 office to their repeaters is an important feature of the present invention and a table and explanation of this interconnection follows.

ing as 8D14, or level 8, group D, contact 14. Vertically below this pairing appears 9B1 paired to 7C14, etc. A rapid scanning of the levels will show that contacts 8—14 of the ninth level appear as paired individually with contacts 7—1 of the various other groups. Also group A contacts are individually paired to group D, and B paired with C throughout. All first contacts are paired with fourteenth, second with thirteenth, etc.

Also, scanning a level such as 9 it will be seen that paired with its contacts individually are contacts of each of the remaining levels in a somewhat even distribution. By this pairing of an equal number of contacts from the remaining levels with the ninth level for example, if the ninth level has all its contacts busied then a minimal number of contacts in each of the remaining groups will be busied thereby.

The last six contacts (15–20) of each bank level have been designated as last choices. In these positions four contacts have been paired to a single repeater such as 51. This may be seen from a check of the final six contacts shown for each level. In the ninth level, for contact 20 appearing at the very bottom of table, it will be seen that for level 9, the A group has its twentieth contact paired with the twentieth contact of the B group. This pairing is in turn mated with a pairing from the eighth level composed of the fifteenth contacts of the C and D group. The four contact, double-pairing provides more possibilities of access to the transfer repeaters such as 51. As can be seen there will be six last choice repeaters listed for each level giving an overall total of 42 transferable repeaters for 196 first choice

TABLE I

| Level 9 | | Level 8 | | Level 7 | | Level 6 | | Level 5 | | Level 4 | | Level 3 | |
|---|---|---|---|---|---|---|---|---|---|---|---|---|---|
| 9A1 | 8D14 | 8A1 | 7D14 | 7A1 | 5D14 | 6A1 | 6D14 | 5A1 | 4D14 | 4A1 | 3D14 | 3A1 | 9D14 |
| 9B1 | 7C14 | 8B1 | 6C14 | 7B1 | 5C14 | 6B1 | 4C14 | 5B1 | 3C14 | 4B1 | 9C14 | 3B1 | 8C14 |
| 9C1 | 6B14 | 8C1 | 5B14 | 7C1 | 4B14 | 6C1 | 3B14 | 5C1 | 9B14 | 4C1 | 8B14 | 3C1 | 7B14 |
| 9D1 | 5A14 | 8D1 | 4A14 | 7D1 | 3A14 | 6D1 | 9A14 | 5D1 | 8A14 | 4D1 | 7A14 | 3D1 | 6A14 |
| 9A2 | 4D13 | 8A2 | 3D13 | 7A2 | 9D13 | 6A2 | 8D13 | 5A2 | 7D13 | 4A2 | 6D13 | 3A2 | 5D13 |
| 9B2 | 3C13 | 8B2 | 9C13 | 7B2 | 8C13 | 6B2 | 7C13 | 5B2 | 6C13 | 4B2 | 5C13 | 3B2 | 4C13 |
| 9C2 | 8B13 | 8C2 | 7B13 | 7C2 | 6B13 | 6C2 | 5B13 | 5C2 | 4B13 | 4C2 | 3B13 | 3C2 | 9B13 |
| 9D2 | 7A13 | 8D2 | 6A13 | 7D2 | 5A13 | 6D2 | 4A13 | 5D2 | 3A13 | 4D2 | 9A13 | 3D2 | 8A13 |
| 9A3 | 6D12 | 8A3 | 5D12 | 7A3 | 4D12 | 6A3 | 3D12 | 5A3 | 9D12 | 4A3 | 8D12 | 3A3 | 7D12 |
| 9B3 | 5C12 | 8B3 | 4C12 | 7B3 | 3C12 | 6B3 | 9C12 | 5B3 | 8C12 | 4B3 | 7C12 | 3B3 | 6C12 |
| 9C3 | 4B12 | 8C3 | 3B12 | 7C3 | 9B12 | 6C3 | 8B12 | 5C3 | 7B12 | 4C3 | 6B12 | 3C3 | 5B12 |
| 9D3 | 3A12 | 8D3 | 9A12 | 7D3 | 8A12 | 6D3 | 7A12 | 5D3 | 6A12 | 4D3 | 5A12 | 3D3 | 4A12 |
| 9A4 | 8D11 | 8A4 | 7D11 | 7A4 | 6D11 | 6A4 | 5D11 | 5A4 | 4D11 | 4A4 | 3D11 | 3A4 | 9D11 |
| 9B4 | 7C11 | 8B4 | 6C11 | 7B4 | 5C11 | 6B4 | 7C11 | 5B4 | 3C11 | 4B4 | 9C11 | 3B4 | 8C11 |
| 9C4 | 6B11 | 8C4 | 5B11 | 7C4 | 4B11 | 6C4 | 3B11 | 5C4 | 9B11 | 4C4 | 8B11 | 3C4 | 7B11 |
| 9D4 | 5A11 | 8D4 | 7A11 | 7D4 | 3A11 | 6D4 | 9A11 | 5D4 | 8A11 | 4D4 | 7A11 | 3D4 | 6A11 |
| 9A5 | 4D10 | 8A5 | 3D10 | 7A5 | 9D10 | 6A5 | 8D10 | 5A5 | 7D10 | 4A5 | 6D10 | 3A5 | 5D10 |
| 9B5 | 3C10 | 8B5 | 9C10 | 7B5 | 8C10 | 6B5 | 7C10 | 5B5 | 6C10 | 4B5 | 5C10 | 3B5 | 4C10 |
| 9C5 | 8B10 | 8C5 | 7B10 | 7C5 | 6B10 | 6C5 | 5B10 | 5C5 | 4B10 | 4C5 | 3B10 | 3C5 | 9B10 |
| 9D5 | 7A10 | 8D5 | 6A10 | 7D5 | 5A10 | 6D5 | 4A10 | 5D5 | 3A10 | 4D5 | 9A10 | 3D5 | 8A10 |
| 9A6 | 6D9 | 8A6 | 5D9 | 7A6 | 4D9 | 6A6 | 3D9 | 5A6 | 9D9 | 4A6 | 8D9 | 3A6 | 7D9 |
| 9B6 | 5C9 | 8B6 | 4C9 | 7B6 | 3C9 | 6B6 | 9C9 | 5B6 | 8C9 | 4B6 | 7C9 | 3B6 | 6C9 |
| 9C6 | 4B9 | 8C6 | 3B9 | 7C6 | 9B9 | 6C6 | 8B9 | 5C6 | 7B9 | 4C6 | 6B9 | 3C6 | 5B9 |
| 9D6 | 3A9 | 8D6 | 9A9 | 7D6 | 8A9 | 6D6 | 7A9 | 5D6 | 6A9 | 4D6 | 5A9 | 3D6 | 4A9 |
| 9A7 | 8D8 | 8A7 | 7D8 | 7A7 | 6D8 | 6A7 | 5D8 | 5A7 | 4D8 | 4A7 | 3D8 | 3A7 | 9D8 |
| 9B7 | 7C8 | 8B7 | 6C8 | 7B7 | 5C8 | 6B7 | 4C8 | 5B7 | 3C8 | 4B7 | 9C8 | 3B7 | 8C8 |
| 9C7 | 6B8 | 8C7 | 5B8 | 7C7 | 4B8 | 6C7 | 3B8 | 5C7 | 9B8 | 4C7 | 8B8 | 3C7 | 7B8 |
| 9D7 | 5A8 | 8D7 | 4A8 | 7D7 | 3A8 | 6D7 | 9A8 | 5D7 | 8A8 | 4D7 | 7A8 | 3D7 | 6A8 |
| 9A-B15 | 8C-D20 | 8A-B15 | 7C-D20 | 7A-B15 | 9C-D20 | 6A-B15 | 5C-D20 | 5A-B15 | 3C-D20 | 4A-B15 | 6C-D20 | 3A-B15 | 4C-D20 |
| 9A-B16 | 8C-D19 | 8A-B16 | 7C-D19 | 7A-B16 | 9C-D19 | 6A-B16 | 5C-D19 | 5A-B16 | 3C-D19 | 4A-B16 | 6C-D19 | 3A-B16 | 4C-D19 |
| 9A-B17 | 8C-D18 | 8A-B17 | 7C-D18 | 7A-B17 | 9C-D18 | 6A-B17 | 5C-D18 | 5A-B17 | 3C-D18 | 4A-B17 | 6C-D18 | 3A-B17 | 4C-D18 |
| 9A-B18 | 8C-D17 | 8A-B18 | 7C-D17 | 7A-B18 | 9C-D17 | 6A-B18 | 5C-D17 | 5A-B18 | 3C-D17 | 4A-B18 | 6C-D17 | 3A-B18 | 4C-D17 |
| 9A-B19 | 8C-D16 | 8A-B19 | 7C-D16 | 7A-B19 | 9C-D16 | 6A-B19 | 5C-D16 | 5A-B19 | 3C-D16 | 4A-B19 | 6C-D16 | 3A-B19 | 4C-D16 |
| 9A-B20 | 8C-D15 | 8A-B20 | 7C-D15 | 7A-B20 | 9C-D15 | 6A-B20 | 5C-D15 | 5A-B20 | 3C-D15 | 4A-B20 | 6C-D15 | 3A-B20 | 4C-D15 |

Legend: 1st No.=bank level; letter=selector group; 2d No.=bank contacts.

In Table I, are shown the first selector levels 3—9 in the #2 office. The contacts are numbered 1–20 and there are four groups of selectors designated A, B, C and D.

The first set of columns is designated level 9 and shows in the left hand column, the first seven contacts of the ninth level in each of the four groups. The first symbol reads 9A1 which means level 9, A group, contact 1. Also in the first set of columns is shown the contact which is paired with 9A1, this contact appear- outgoing trunks at the #2 office. The transferable repeaters are normally maintained for use incoming to the #2 choice so that normally only the first choice trunks are available for outgoing use at the #2 office.

Taking the left hand column for each level, there are 28 paired first choice contacts for that level. These consist of contacts 1—7 of each of the four selector groups. It is these 28 contacts per level which determine the busy condition for transfer as shown in Figs. 2 and 3.

*Detailed description*

NORMAL CALL FROM #2 OFFICE TO THE #9 OFFICE

Figure 4:
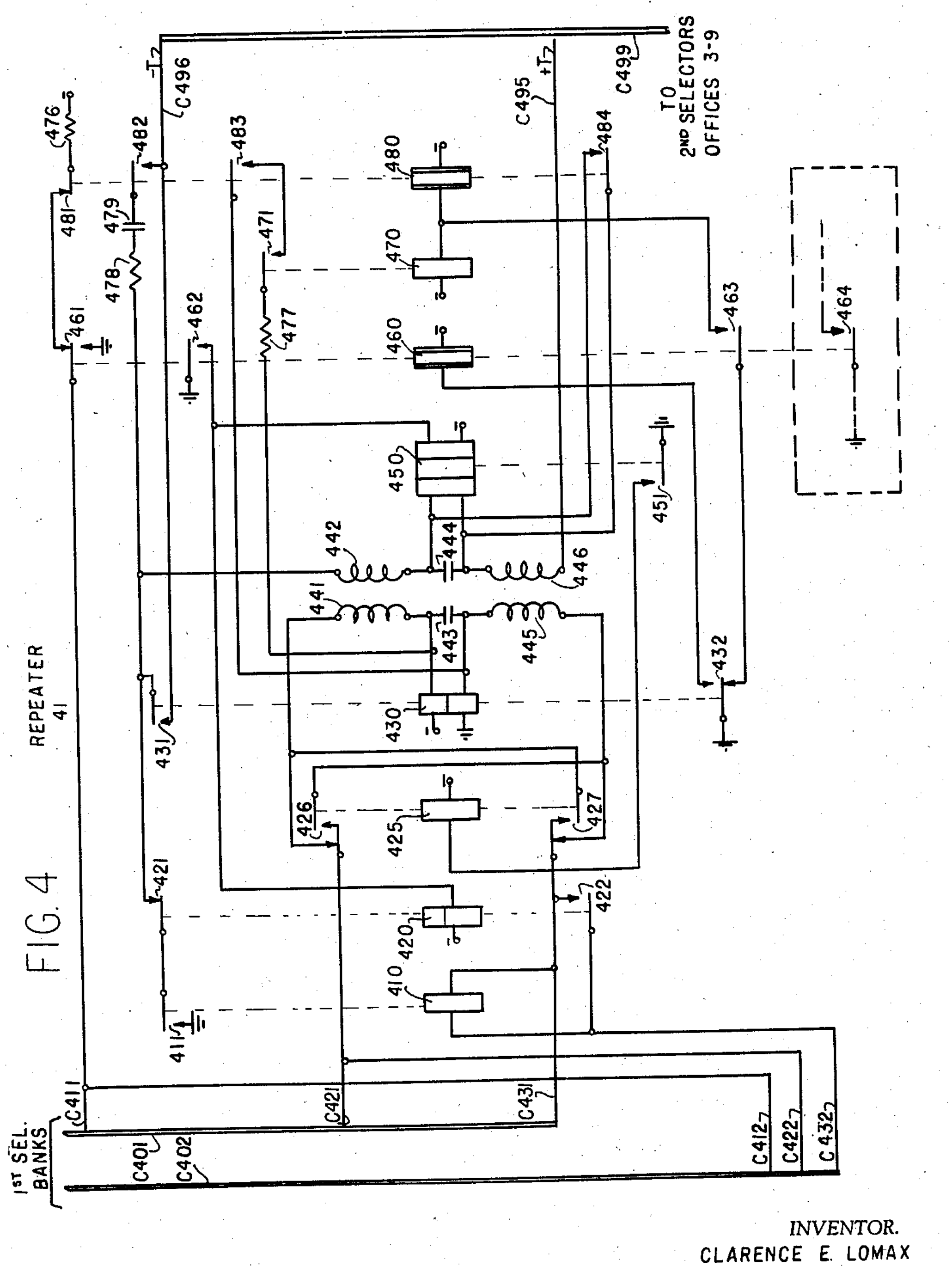

When an inter-office call is to be made from the line 2400 in the #2 office, the line equipment 10 and first selector 11 are seized. The digit 9 is dialled, and selector level 9 is reached and the searching begun. Since selector 11 is battery searching, no battery appears on contacts 1—4 as these contacts have been assumed as busy for purposes of explanation. When the fifth contact is reached, assuming that repeater 41 is associated with that contact, the searching process of the selector C wiper takes place on the lead C421 of cable C401 of Fig. 4. An indication is returned to the selector in the form of battery over the path through resistor 476, contacts 481 and 461. This indicates to the selector that an idle repeater 41 has been found. The loop circuit from the subscriber phone is closed to leads C431 and C421 of cable C401. The closed loop completes a path from battery through the upper winding of relay 430, repeat coil winding 441, contacts 426, the loop circuit, contacts 427, coil 445, the lower winding of relay 430 to ground. Relay 430 then operates and closes its contacts 432 to relay 460. Relay 460 operates. At contacts 461, ground is sent back on lead C421 to busy the repeater at the selector bank. At contacts 462, ground is closed to the right winding of shunt field relay R450. Relay 450 does not operate at this time. Also on closing of contacts 462, ground is closed to relay 420. At contacts 463 a preparatory circuit to relays 470 and 480 is closed.

Figure 2:
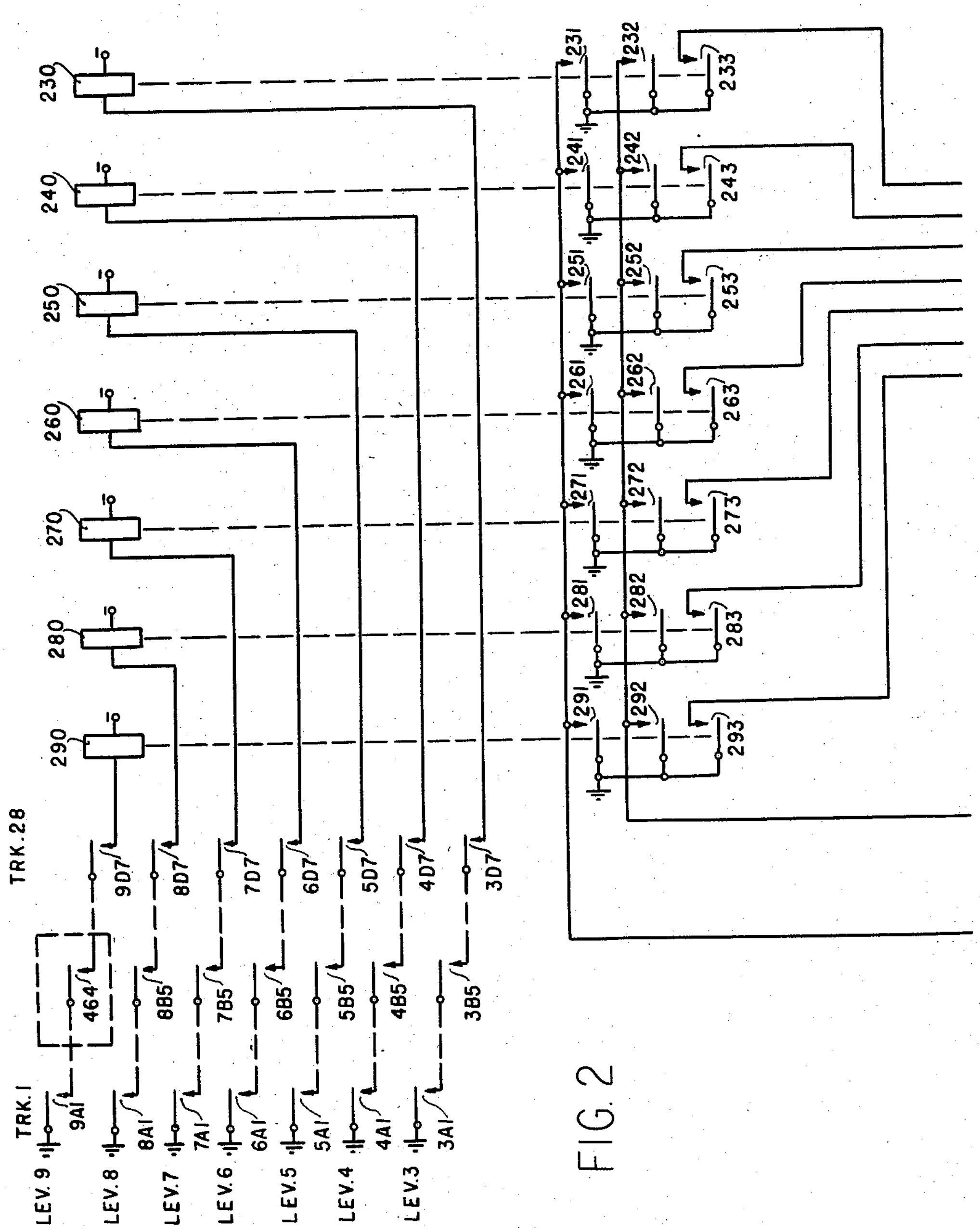

Contacts 464 are also closed, thus closing this link in the chain circuit of Fig. 2 corresponding to the fifth contact on the ninth level of the B selector group.

Relay 420 operates and at its contacts 422 shunts relay 410 from possible operation and at contacts 421 further opens the path to conductor C496 of cable C499.

At this point the resistance of the left winding of relay 450 is bridged across the +T and —T leads, C495 and C496 respectively through contacts 431 to seize the incoming selector in the distant office. The absence of ground on lead C495 indicates to the incoming selector that the ninth level is the level desired. The incoming selector 81 is of the 20 level, 10 trunk type and, as mentioned, the absence of ground on +T lead C495 of cable C499 indicates to the selector that the next digit is to be forwarded to the equipment of the #9 office using its lower wiper levels. Selector 81 would have 10 of its levels connected to the #9 office and 10 of its levels to the #8 office.

The further digits would then be dialled and transmitted in a fully known manner and the call therefore completed. When the call is terminated and the repeater 41 released, contacts 464 would release to open the chain.

Figures 1A, 1C:
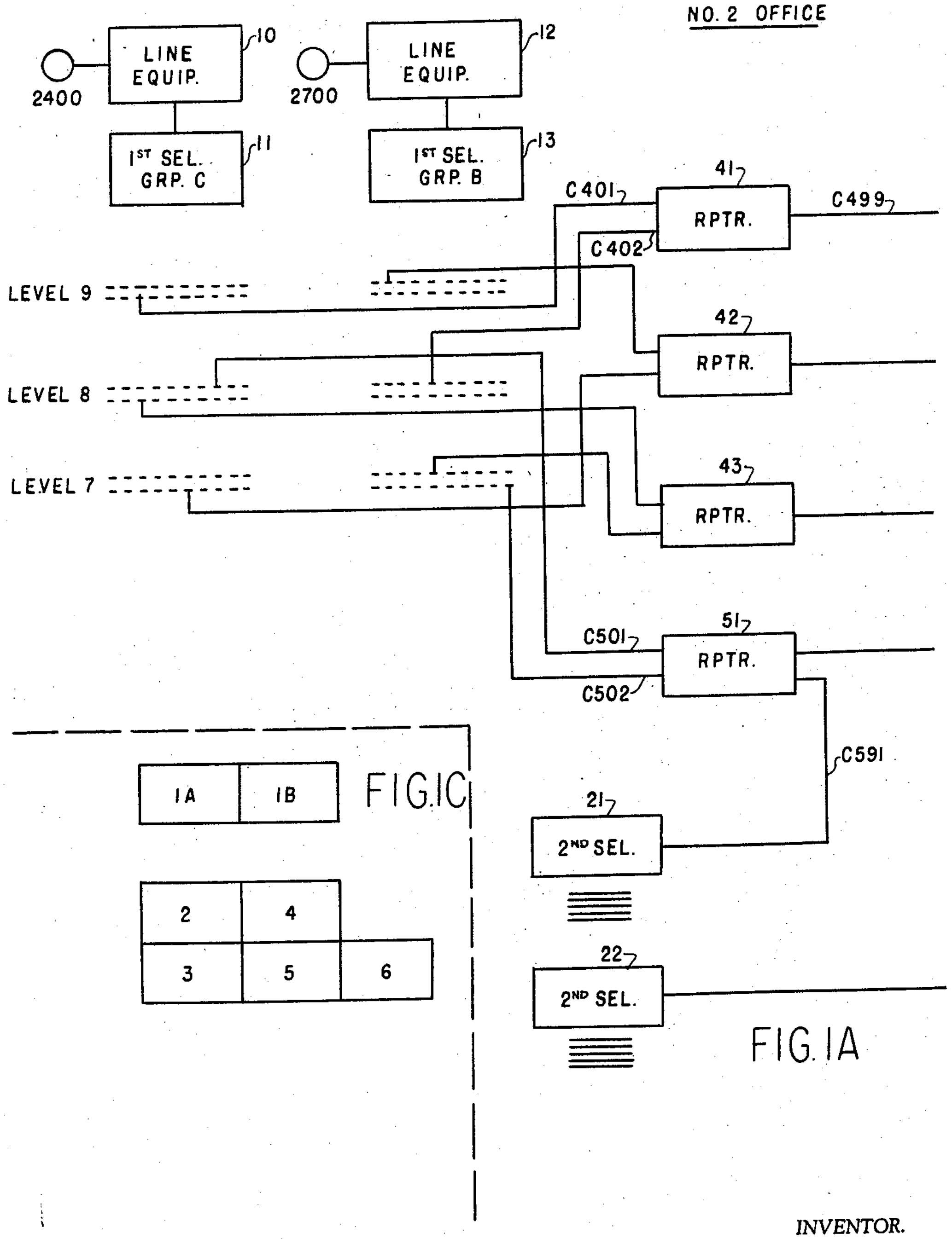
Figure 1B:
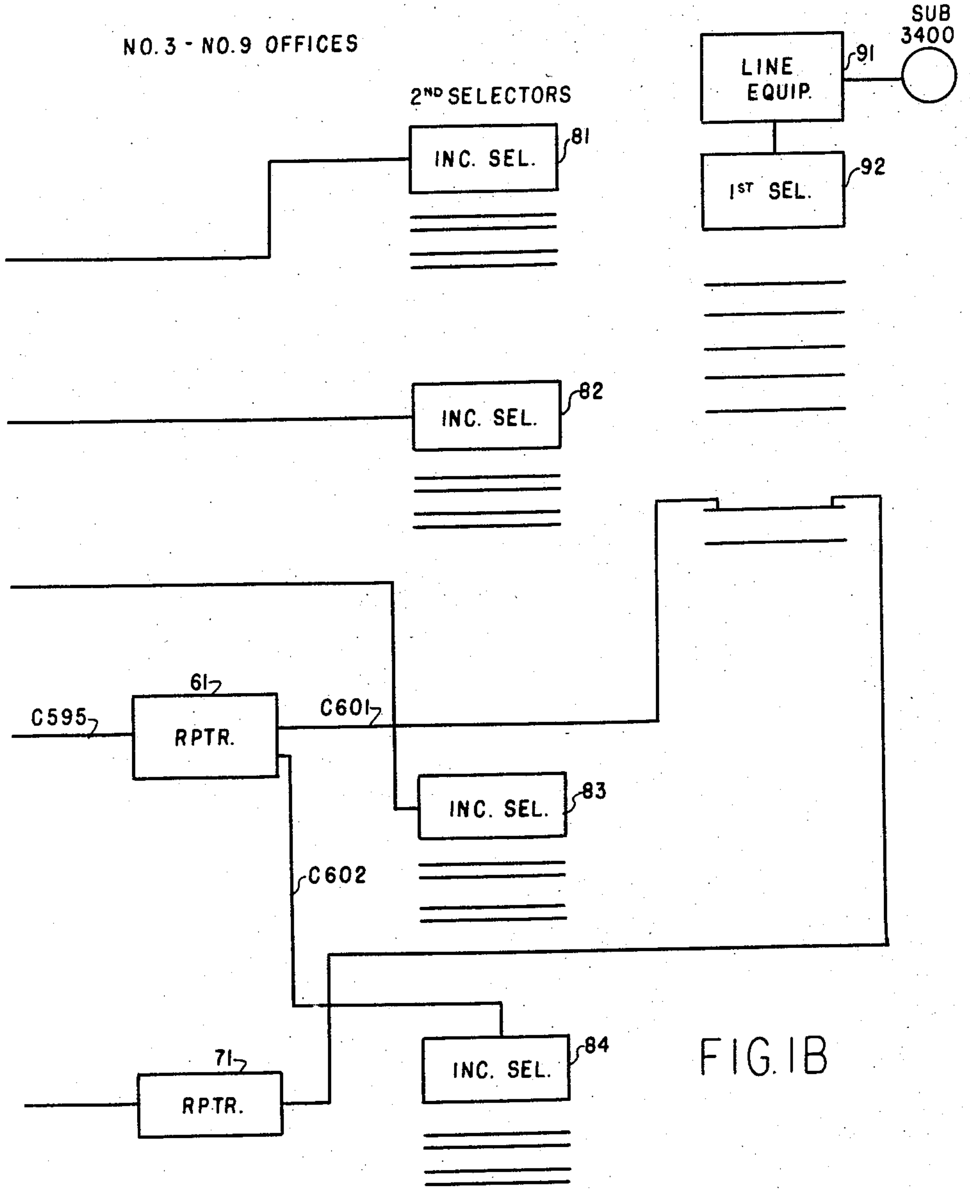

On a call to the #8 office from subscriber 2700, a similar operation would, in general, occur in seizing the line equipment 12 and a selector 13. After dialling the digit 8, the idle tenth contact would be found again accessing repeater 41 on the leads of cable C401. It has again been assumed that contacts having no connections to repeaters shown in Fig. 1A are busy. For group B selector 13, the first contact on the eighth level capable of being seized is the tenth. Relay 410 of Fig. 4 would in this case be energized in series with relay 430. At contacts 411 ground is closed through contacts 421 and 431, and lead C496 of cable C499 to the incoming selector to notify that its upper wiper levels are to be used, these connecting to the #8 office equipment. Otherwise, the seizing procedure is as described previously.

*Busy condition—single level busy*

As has been previously been shown with regard to Table I, each of the levels 3—9 may be considered as each having 28 first choice repeaters directly associated with it. Each of these repeaters such as repeater 41 of Fig. 4 has a pair of chain contacts such as 464. A representative group of these contacts are shown in the upper left corner of Fig. 2, with contacts 9A1, 464, and 9D7 shown for level 9 and corresponding contacts for the remaining levels.

If the 28 first choice repeaters on any level become busy, the entire chain circuit is completed. Assuming that level 8 shows all repeaters busy, a circuit is closed from ground to relay 280 and battery. Relay 280 operates and at its contacts 282 closes ground through contacts 381, 356, 361, and relay 310 to battery. At contacts 283 ground is closed to the second bank contact of level A of rotary switch 388.

Relay 310 operates and at its contacts 313 locks itself to ground at contacts 357. At contacts 311 pulse source 390 is closed to motor magnet 380 of rotary switch 388. Pulse source 390 provides ground pulses at a constant, fairly low rate. Motor magnet 380 operates on receipt of the first ground pulse after contacts 311 have closed to advance switch 388, a rotary switch of any suitable type, one step. As the switch steps, off-normal springs 381 open to open the original operate path to relay 310. Wiper 385 finds absence of ground on the first contact of level A so nothing additional occurs. When wiper 385 is stepped to the second contact, the ground from contact 283 is found and transmitted through contacts 321 to relay 315 and battery. Relay 315 operates. At contacts 316, the operate ground to relay 315 shunts out relay 320 through closed contacts 358 to ground at closed contacts 281 of Fig. 2.

Rotary switch 388 then begins the next step. As the switch wiper begins its advance, the ground is momentarily removed from wiper 385 and the shunt of relay 320 is momentarily opened. Relay 320 then operates in series with relay 315. At contacts 321, the original operate path to relay 315 is opened but relay 315 remains operated over the relay 320 operate path.

Figure 3:
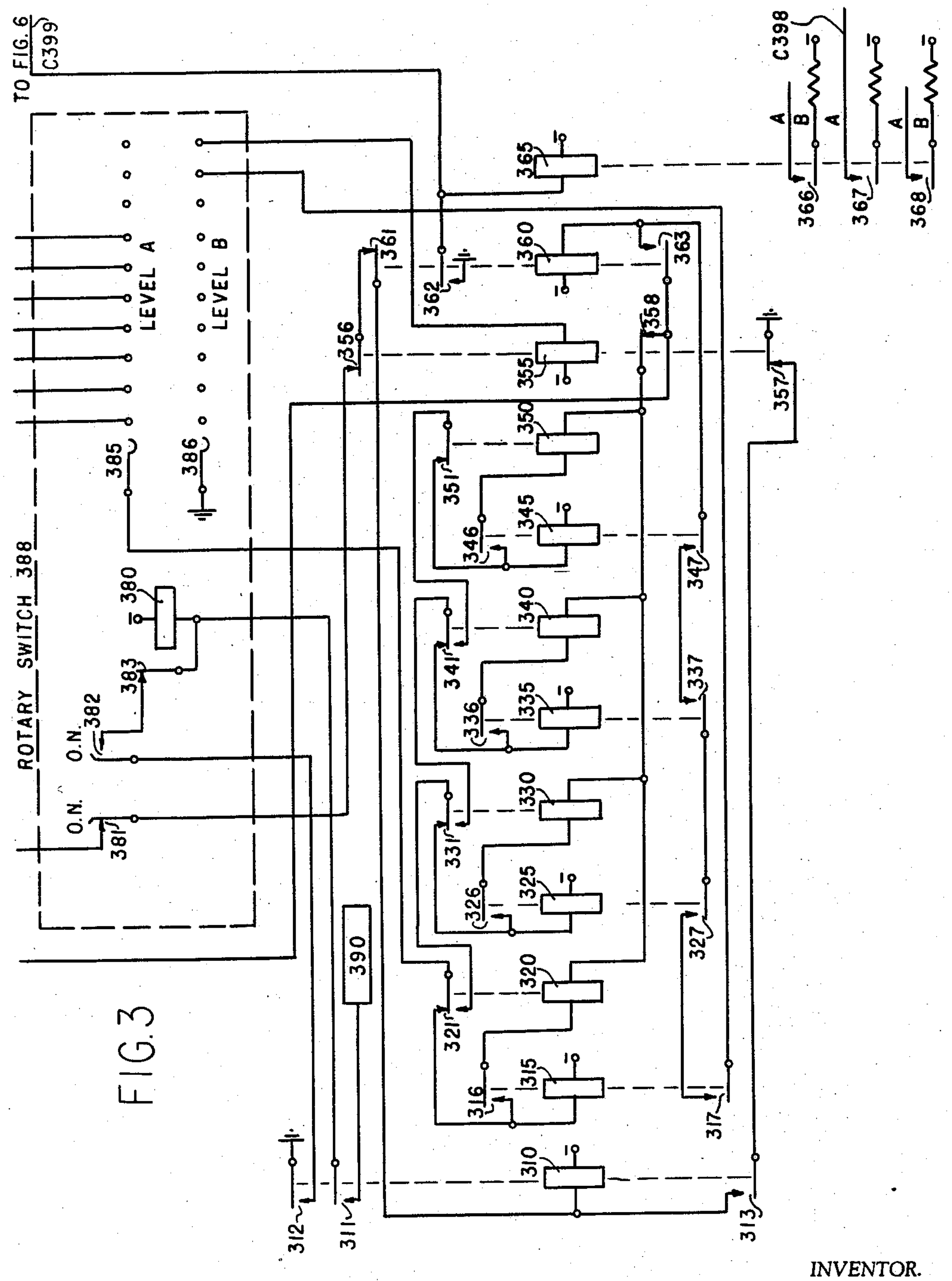

Rotary switch 388 continues stepping due to the timed pulses from source 390. If no additional levels are found busy, none of the remaining counting relays of Fig. 3 are operated. Wiper 386 continues to be stepped and as this wiper accesses the tenth contact of the B level, ground is closed to relay 355 which then operates.

At contacts 356, the previously opened operate path of relay 310 is further opened. At contacts 357, the holding path to relay 310 is opened. At contacts 358, the holding path to relays 315 and 320 is opened. Relay 310 releases as do relays 315 and 320. Switch 388 returns to normal and if no further levels become busy, the switch remains at rest.

*Busy condition—four levels*

Whenever a level indicates by means of its chain circuit that all its first choice repeaters are busy, switch 388 begins its hunting operation as described. When four of the seven levels, for example 8, 6, 5 and 4, become busy, the operating sequence is as follows: Relay 280 operates as previously described. Relays 260, 250 and 240 also operate. Ground is placed on the second, fourth, fifth and sixth contacts of level A of switch 388. When the switch has taken its second step, relays 310, 315 and 320 have operated as previously described. On the third step of the switch, no ground appears at the bank contacts so no additional operations occur at this time. As the switch takes its fourth step, ground from closed contacts 263 is sent through wiper 385, contacts 321, 331 to relay 325 and battery. Relay 325 operates its contacts 326 to shunt out relay 330. Relay 330 operates during the stepping process in a manner similar to the operation of relay 320. Ground from contacts 253 causes relays 335 and 340 to operate from the ground on level A through contacts 321, 331 and 341 in basically the same manner as described for relays 315 and 320. Ground from contacts 243 causes relays 345 and 350 to operate in a like manner. Operation of these relays has closed contacts 317, 327, 337 and 347. As the switch 388 continues advancing, wiper 386 steps onto the ninth contact of level B. Ground is closed through contacts 317, 327, 337 and 347 to relay 360. Relay 360 operates and at contacts 363 locks itself to the multiple holding ground at contacts 281, 261, 251 and 241. At contacts 362 ground is closed to relay 365. Relay 365 operates its contacts 366, 367 and 368. At contacts 367, battery is closed through lead C398 (Fig. 5), contacts 571 and 561 to C leads C511 and C521 to allow the repeater to be accessed from the battery searching selector at office #2.

Figure 6:
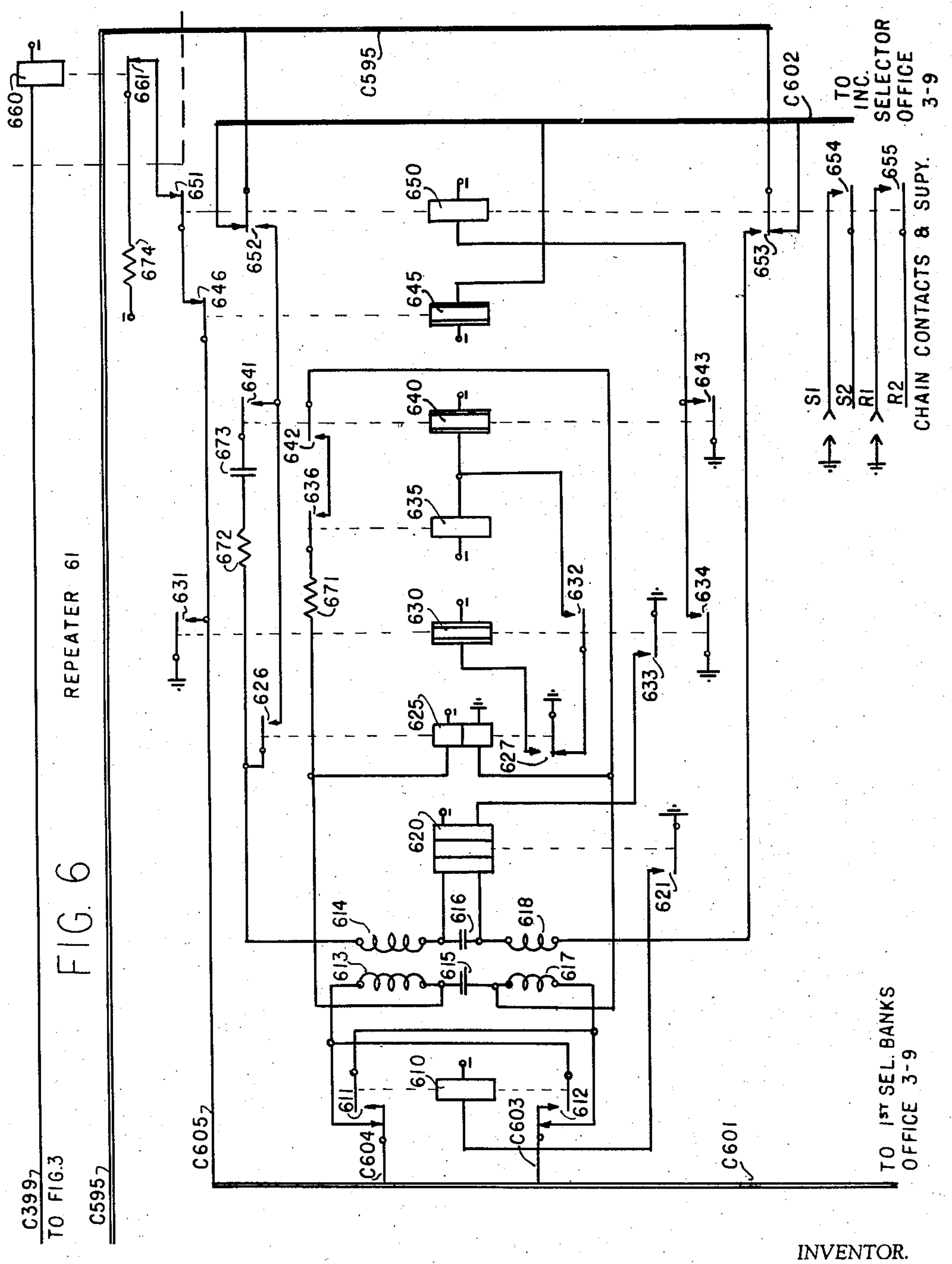

The ground at contacts 362 is also sent on lead C399 to relay 660 of Fig. 6. This necessitates that lead C399 extend from the #2 office to #3—#9 offices. It is obvious that slave relays may be employed in the #3—#9 offices to follow the operation of relay 660 in order to switch all transferable trunks. Relay 660 operates and opens contact 661. By opening these contacts, resistance battery is removed from the C lead C605 to the selector banks in offices #3—#9 and the repeater can no longer be accessed from the #3—#9 offices.

Switch 388 then steps wiper 386 to the tenth contact, at which time ground is again placed on relay 355. Relay 355 operates contacts 358 to remove the multiple holding ground from relays 315, 320, 325, 330, 335, 340, 345 and 350. These relays then release. The relay 310 hold path is opened at contacts 357 and the original operate path to relay 310 is opened at contacts 361. In this manner, rotary switch 385 is stopped from its hunting until relay 360 releases.

Relay 360 remains operated then, as long as at least one selector level has all its repeaters busied. When all levels release their chain contacts, ground is removed from relay 360 and this relay releases, artificially busying the transferable repeater 51 at the #2 office. Relay 660 is released on removal of its operate ground and transfer repeater 61 may then be accessed in the #3—#9 offices.

*Calls from offices #3—#9 to #2 office*

First choice calls from the main exchange to the #2 office would be essentially as described previously with no added features which are not generally known.

Figure 5:
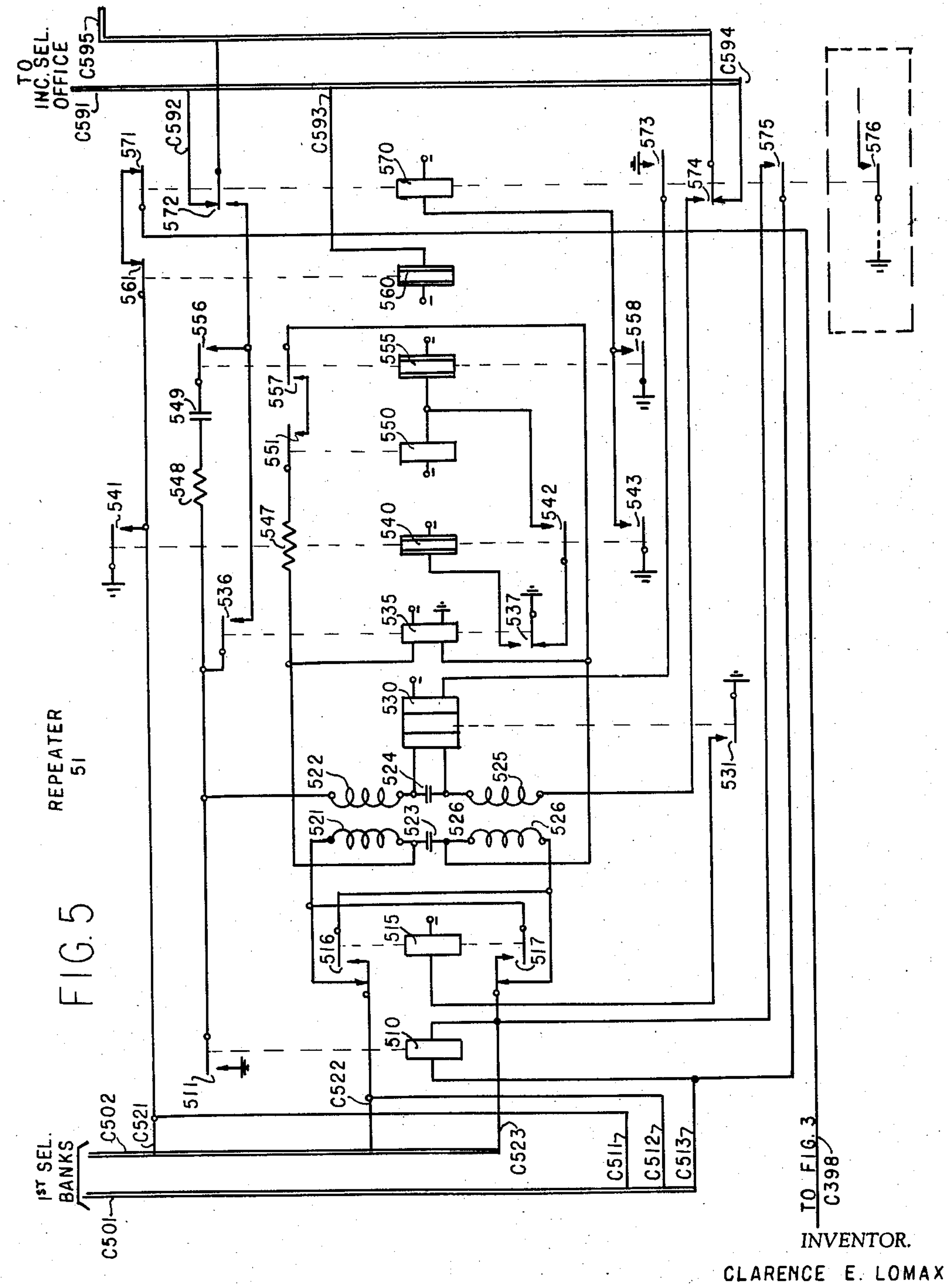

Last choice calls through repeater 61 of Fig. 6 and repeater 51 of Fig. 5 will now be described in more detail. When selector 92 is stepped to the second level, a wiper of selector probes for resistance battery on the C lead C605 of cable C601. This resistance battery is fed through resistor 674, contacts 661, 651, 646 to the C605 lead to mark the repeater as amenable to seizure. Upon seizure the closed loop from the subscriber will cause relay 625 to operate over a path from battery, the upper winding of relay 625, repeat coil winding 613, contacts 611, subscriber's loop on conductors C603 and C604 of cable C601, contacts 612, repeat coil winding 617, lower winding of relay 625 to ground. At contacts 627, ground is closed to relay 630. Relay 630 operates, closing contacts 631 to send busy ground back to the selector bank. At contacts 633, ground is closed to the right winding of shunt field relay 620. At contacts 634 ground is closed to relay 650 to operate it. At contacts 651, the resistance battery is removed from the selector bank C wiper thereby aiding in busying the switch. At contacts 652 and 653, the left winding of shunt field relay 620 is bridged across the leads of cable C595. The leads of cable C595 individually pass through contacts 574 and 572 of Fig. 5 to thereafter seize an incoming selector such as 21 at the #2 office.

When the selector is seized, a signal in the form of a ground pulse is sent back on the C lead to the seizing switch. In this instance the C lead C593 of cable C591 transmits the ground pulse to relay 560. Relay 560 on operating operates contacts 561. Contacts 561 are in the resistance-battery path of repeater 51 for seizure from first selectors such as 11 or 13. By maintaining contacts 561 open, repeater 51 is in effect busied to all attempted calls from the #2 office.

If while repeater 51 is in use on an incoming call to the #2 office, a busy condition occurs causing the trunk transfer circuit of Figs. 2 and 3 to operate, repeater 51 cannot be seized at the #2 office. On occurrence of a transfer, resistance battery is sent on lead C398 to contacts 571. Due to contacts 561 being open, no resistance battery can be transmitted on the C leads C521 of cable 502 or C511 of cable C501 to the first selector banks. Absence of battery marks the repeater as busy. When repeater 51 is released, the ground is removed from relay 560 which then releases. Repeater 51 is then marked as idle and amenable to calls at the #2 office after contacts 561 have closed.

What is claimed is:

1. In a telephone system comprising a plurality of exchanges interconnected by two-wire trunks, a first exchange and a second exchange, a plurality of said trunks sequentially seizable as first choices at said first exchange and terminating in said second exchange, others of said trunks sequentially accessible as first choices at said second exchange, further ones of said trunks sequentially accessible at said second exchange as last choices, a chain circuit rendered operative when a predetermined number of the first choice trunks accessible at said first exchange have been seized and are in use simultaneously, means controlled by the operation of said chain circuit to remove said last choice trunks from accessibility at said second exchange and rendering said last choice trunks accessible to the first exchange as sequential last choices.

2. In a telephone system comprising a plurality of step-by-step offices, a first exchange having a single office, a second exchange having a plurality of offices, an individual group of trunks from said first exchange to each of the offices of said second exchanges, each of said trunk groups accessible from a separate level of the step-by-step equipment of said first exchange, each of said trunk groups divided into a first and a second sequentially accessible set of trunks, said second sets of trunks maintained inaccessible at said first exchange and accessible at said second exchange, testing means rendered effective when a first set of trunks from a single level has been seized to further test the remaining first sets of trunks on other levels, said testing means further effective when a predetermined number of levels of said first sets have all trunks busy therein to cause said second sets of trunks to be rendered inaccessible at said second exchange and rendered accessible at said first exchange.

3. In a multi-office telephone system, a first exchange comprising a single office and a second exchange comprising a plurality of offices, two-wire trunks connecting the first exchange to the offices of said second exchange, two-motion switching equipment at said first exchange, said switching equipment including a plurality of selectors each having a plurality of levels, each of said levels having association with a separate office, a plurality of repeaters capable of being seized sequentially from the switch levels, each of said repeaters capable of being seized from one of two separate levels of said switches and directly connected to a single one of said two-wire trunks, means in each of said repeaters for directing the connection to the office in the second exchange associated with the level from which said repeater was seized, a plurality of repeaters at the offices of said second exchange sequentially seizable as first choices and connected individually to the trunks to said first exchange, a second plurality of repeaters sequentially seizable at the offices of said second exchange as second choices, each of said second choice repeaters directly connected to a single two-wire trunk and terminating at repeaters in said first exchange, the repeaters at said first exchange comprising two types, a first of said types being sequentially seizable as first choices at said first exchange, the second of said types each terminating a single two-wire trunk from the second choice repeaters at said second exchange, said second type repeaters maintained inaccessible at said first exchange, circuit means rendered operative on a predetermined number of the first choice repeaters from said first exchange having been seized and remaining in use simultaneously, transfer means responsive to the operation of said circuit means to render said second choice repeaters at the offices of said second exchange inaccessible at said second exchange and further rendering the second type repeaters sequentially seizable as last choices at said first exchange.

4. In a telephone system having a first exchange and a second exchange, a plurality of two-wire trunks interconnecting said exchanges, said first office having a plurality of step-by-step selectors, each of said selectors having access to a plurality of repeaters in said first exchange, said selectors each having a searching conductor to sequentially searching said repeaters, said selectors responsive to a resistance battery condition on the searched conductor of one of said repeaters when transmitted to the searching conductor to cause the searching selector to seize the searched repeater, the seized repeater thereafter removing said resistance battery from its searched conductor to prevent seizure by other selectors, each of the repeaters in said first exchange directly associated with a single one of said trunks to said second exchange, the repeaters at said first exchange including a first group of repeaters sequentially accessible as first choices at said first exchange, and also including a second group of repeaters in said first exchange accessible from the selectors in said first exchange in certain instance and also accessible over the associated trunk interconnecting it to said second exchange, means in each of said second group repeaters when accessible over its associated trunk for retaining the resistance battery disconnected from the searched conductor of the said second group repeater thereby artificially busying the said second group repeater out of accessibility at said first exchange, transfer means responsive to a predetermined number of said first group repeaters being in a seized condition to thereafter restore the resistance battery to the searched conductor of the second group repeaters and further artificially busying said second group repeaters out of accessibility from said second exchange over the associated trunks.

5. In a telephone system having a first and a second exchange, said first exchange comprising a plurality of offices, a plurality of one-way trunks for use in calls in each direction between said exchanges, switching apparatus comprising a plurality of numerical switches of the two-motion type at said second exchange, each of the offices of said first exchange with a separate level of said two-motion switches at said second exchange, a plurality of said one-way trunks accessible from said levels, a plurality of normally one-way trunks accessible at said first exchange, circuit means operated responsive to all the one-way trunks from a predetermined number of said levels registering as busy to thereafter transfer said normally one-way trunks from accessibility at said first exchange to accessibility at said second exchange.

6. In a system as set out in claim 5, said circuit means releasing after all of said levels have idle trunks registering thereon, said circuit means upon release transferring said normally one-way trunks from accessibility at said second exchange to accessibility at said first exchange.

7. In a telephone system, a plurality of central offices, a plurality of step-by-step switches in a first of said offices, each of said switches having a plurality of levels and a plurality of contacts constituting each level, each of the levels of each one of said switches directly associated with a different one of the other offices of said system, repeaters in said first office each selectively seizable from one of two of the levels of contacts on said switches, each of said repeaters thereby having connection to two of said offices, each of the contacts on a level having individually paired therewith a contact in successively different ones of the other levels of said switches.

8. In a telephone system, a plurality of central offices, a first of said offices having a plurality of two-motion switches, said two-motion switches arranged in a plurality of groups, each of said two-motion switches having a plurality of levels, each of said levels consisting of a plurality of contacts, a plurality of repeaters accessible from the contacts of said two-motion switches, each of said repeaters having access to two others of said offices, a first contact having access to a repeater, said first contact having paired therewith a contact from a level other than the level of said first contact, said first and its paired contact each being on switches in separate ones of said switch groups, said first contact being sequentially first on its level, said paired contact being sequentially last of a group on its level, each contact successive to said first contact on the level of said first contact having individually paired therewith a contact in successive other of the levels from which said repeaters are accessible, the contacts paired with the contacts of said first contact level inversely sequentially paired with the contacts of the level of said first contact, a second level on the switch of said first contact, the contacts of said second level sequentially paired individually with contacts in sequentially reversed order on other of the levels of said switches, said individual pairing also including the pairing of contacts on said second level individually with contacts on successive other levels of said switches.

9. A telephone system having a plurality of offices interconnected by trunks, certain of said trunks connectable as first choices at a first office, others of said trunks connectable as second choices at said first office, a second office having trunks connectable as first choices and other trunks as second choices, said second choice trunks in the first office also being the second choice trunks in the second office, each of the second choice trunks having associated therewith artificial busying means at each office, said busying means retained operative at said first office and inoperative at said second office, transfer means operated in response to a predetermined number of first choice trunks from said first office being in use to cause the busying means at said first office to become inoperative for all second choice trunks not in use at said second office and to cause the busying means at the second office to become operative for all second choice trunks not in use, said transfer means thereafter causing the busying means at said first office to become inoperative for all second choice trunks which thereafter are freed from use, said transfer means further operating the busying means in said second exchange for all second choice trunks which are freed from use.

10. In a telephone system, a bi-level pulse repeater having a plurality of incoming leads and a plurality of outgoing leads, said incoming leads including two control conductors, contact means in said repeater for placing resistance battery on both said control conductors to mark the repeater as capable of being seized over its incoming leads, said contact means effective upon said repeater being seized over its incoming leads for removing said resistance battery to thereby mark said repeater as incapable of being further seized, relay means in said repeater operable when said repeater is seized over its incoming leads to receive and repeat impulses transmitted thereto out on outgoing leads, said relay and contact means restoring on release of said repeater, second contact means operable in response to the operation of a transfer means to remove said resistance battery from said incoming control leads to thereby cause said repeater to be inaccessible over the incoming leads, second relay means operable thereafter ot transmit pulses from certain of the outgoing leads, further contact means cooperatively connected to pass said pulses to other of said outgoing leads.

References Cited in the file of this patent

UNITED STATES PATENTS

| | | |
|---|---|---|
| 1,789,606 | Stehlik | Jan. 20, 1931 |
| 2,201,986 | Collis | May 28, 1940 |
| 2,397,887 | Schroeppel | Apr. 2, 1946 |